UNITED STATES PATENT OFFICE.

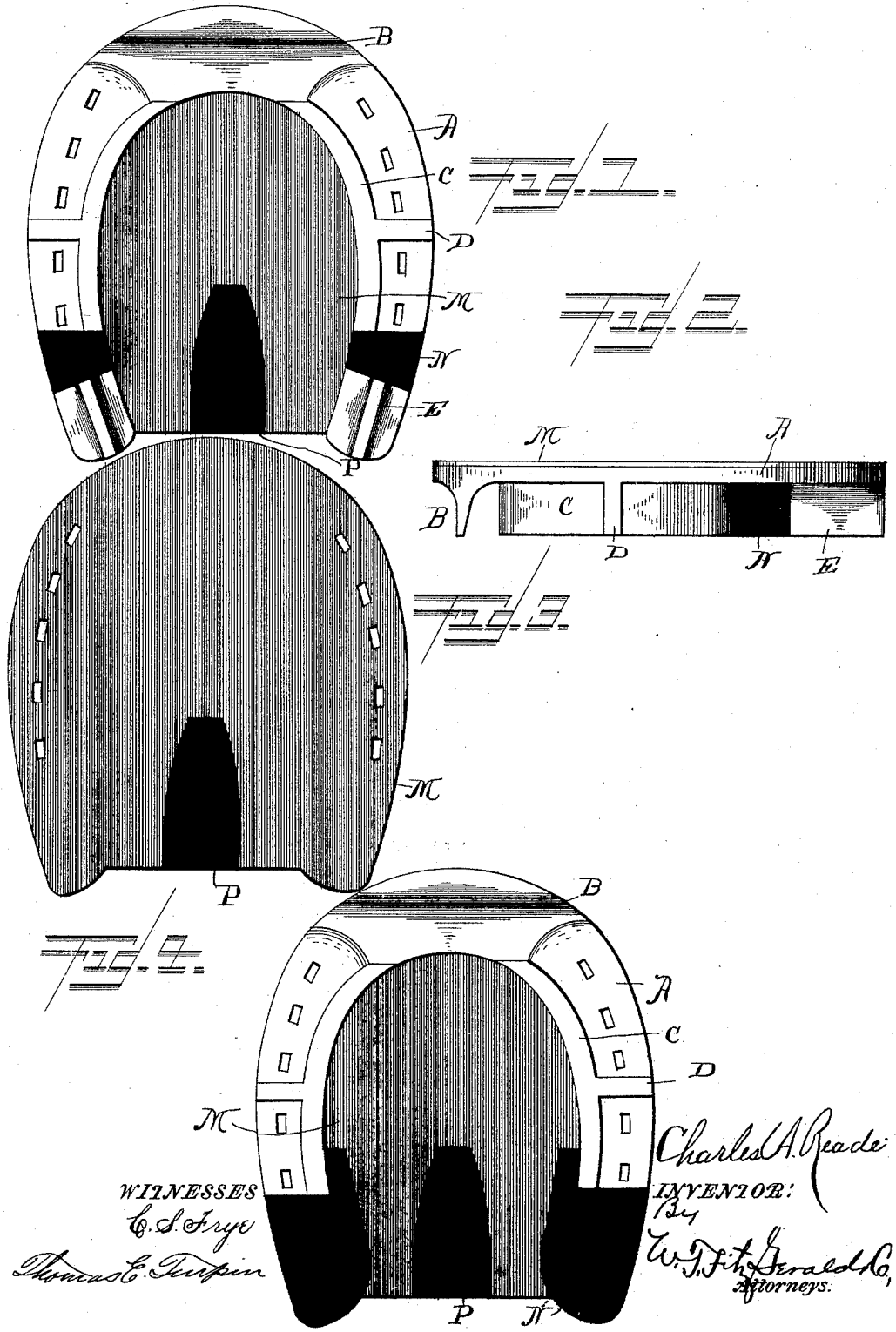

CHARLES A. READE, OF CHICAGO, ILLINOIS.

HORSESHOE.

SPECIFICATION forming part of Letters Patent No. 482,650, dated September 13, 1892.

Application filed February 13, 1892. Serial No. 421,425. (No model.)

*To all whom it may concern:*

Be it known that I, CHARLES A. READE, a citizen of the United States, residing at Chicago, in the county of Cook and State of Illinois, have invented certain new and useful Improvements in Horseshoes; and I do hereby declare the following to be a full, clear, and exact description of the invention, such as will enable others skilled in the art to which it appertains to make and use the same.

The invention consists in the advantageous form and relative positions of the calks with respect to each other and with respect to a cushion-pad; and its novelty will be fully understood from the following description and claims, when taken in conjunction with the accompanying drawings, in which—

Figure 1 is an inverted plan view of my improved horseshoe, the cushion-pad being illustrated in its proper relative position. Fig. 2 is a side elevation of the shoe. Fig. 3 is a plan view of the pad removed, and Fig. 4 is an inverted plan view of a modified construction of shoe.

In the said drawings similar letters designate corresponding parts throughout the several views, referring to which—

A indicates the body-bar from which my improved shoe is formed, which bar is preferably formed of iron and has the several calks formed upon or connected to it before it is bent into the requisite shape to conform to the hoof of a horse or other animal.

B indicates the toe-calk of my improved shoe, which is of the approximate proportional size illustrated and is preferably beveled toward its lower edge to present a sharp edge to the ground and prevent the animal from slipping.

Formed upon or connected to the under side of the body-bar A at about the proportional distance illustrated from the toe-calk B are the side calks C, which are preferably of the proportional length and width illustrated and preferably have their inner edges resting flush with the inner edge of the said bar A and being preferably of the same height as the other calks and branches, whereby they occupy a position between the toe-calk B and the heel-calks, presently described, and enable the shoe to rest firmly upon the ground.

Preferably formed integral with the side calks C and the bar A and extending laterally from the said calks are angular branches D, which are preferably of the proportional length and width as illustrated and serve in practice to prevent the side calks C from taking down into the slot of a cable railway or other similar opening in the street or ground.

By the provision of the angular branches, as illustrated and described, it will be perceived that the weight of the shoe is not materially increased, as would be the case were the calk made the full width of the shoe, and by the use of such branches instead of having the calks the full width of the shoe it will be further perceived that a material saving of metal is effected.

E indicates the linear heel-calks of my improved shoe, which are preferably of the proportional length and width as illustrated and are arranged at the proportional distance shown from the rear ends of the side calks. They are thus arranged below or at an interval from the rear ends of the side calks, as shown, for the purpose of providing a space for the insertion of the quarter-pads N.

Suitably connected to the upper side of the body-bar A of the shoe is a webbing M, which is of a shape in conformity to that of the shoe and is designed to serve as a cushion to all parts of the hoof, as well as for the attachment of the cushion-pads, presently to be described.

Connected to or formed integral with the webbing M and depending therefrom are what I term "quarter-pads," which are indicated by the letter N and rest between the contiguous ends of the side and heel calks, to the inside of the former of which they are preferably connected.

Preferably formed integral with and depending from the webbing M, between the quarter-pads N, is a frog-pad P, which serves in practice to protect the frog of the hoof from injury. The quarter and frog pads N and P are preferably formed from rubber, and by their relative arrangement and the manner in which they are connected to the webbing and the shoe it will be readily perceived that in practice they will take up a large percentage of the shock incidental to travel on hard roads and will effectually protect the hoof of the horse from injury.

In Fig. 4 of the drawings I have illustrated a modified construction of shoe in which the heel-calks are omitted and the quarter cushion-pads N' enlarged to take the place of the said calks.

By the provision and relative arrangement of the several calks, as illustrated and described, it will be readily perceived that the shoe will rest firmly upon the ground, all of the calks will be prevented from taking down into a cable-railway slot or the like, and no space is afforded of sufficient width to receive a track-rail or other obstruction calculated to trip and throw an animal.

Although I have specifically described the construction and relative arrangement of the several elements of my improved shoe, yet I do not desire to be confined to the same, as such changes or modifications may be made as fairly fall within the scope of my invention.

Having thus described my invention, what I claim, and desire to secure by Letters Patent, is—

1. A horseshoe consisting of its body having on its under side a toe-calk, the full-height calks connected therewith and having their inner edges resting flush with the inner edge of the body, the angular branches connected to and extending from the outer edges of the side calks to the outer edge of the body, and the linear heel-calks located midway of the heel of said body and below and out of line with said side calks, substantially as and for the purposes specified.

2. The combination, with the body of a horseshoe, having a toe and side calks, with angular branches extending from the side calks to the outer edge of the body, and the heel-calks located midway of the heel of said body and below and out of line with said side calks, of a web spanning the shoe on its upper side and having quarter-pads adapted to be seated between the contiguous ends of the side and heel calks and the frog-pad connected to the web between said quarter-pads, substantially as and for the purpose specified.

In testimony whereof I affix my signature in presence of two witnesses.

CHARLES A. READE.

Witnesses:
CHAS. W. HINKLEY,
KENNETH HOLLISTER.